United States Patent [19]
Hazzard

[11] Patent Number: 5,913,629
[45] Date of Patent: Jun. 22, 1999

[54] WRITING IMPLEMENT INCLUDING AN INPUT STYLUS

[75] Inventor: Thomas B. Hazzard, Providence, R.I.

[73] Assignee: ttools, LLC, Providence, R.I.

[21] Appl. No.: 09/074,244

[22] Filed: May 7, 1998

[51] Int. Cl.⁶ .......................... B43K 29/00; B43K 24/08
[52] U.S. Cl. .................. 401/33; 178/19.01; 178/19.03; 178/19.05; 345/179; 401/34; 401/37; 401/52; 401/109; 401/195
[58] Field of Search .................. 401/52, 195, 37, 401/34, 33, 32, 31, 29, 109, 258, 99, 110, 111, 112, 113, 114; 345/179, 182; 178/19.01, 19.03, 19.04, 19.05; D19/51, 35, 54, 41; 33/41.6

[56] References Cited

U.S. PATENT DOCUMENTS

| | | | |
|---|---|---|---|
| 14,306 | 2/1856 | Cross | 401/31 X |
| 210,256 | 11/1878 | Hoffman | 33/41.6 |
| D. 390,872 | 2/1998 | Sunaga . | |
| 1,902,865 | 3/1933 | Koester | 33/41.6 |
| 2,519,502 | 8/1950 | Rem | 401/31 |
| 3,479,742 | 11/1969 | Starkenberg | 401/195 X |
| 4,203,682 | 5/1980 | Hepworth . | |
| 4,667,182 | 5/1987 | Murphy . | |
| 5,142,161 | 8/1992 | Brackmann | 401/52 X |
| 5,203,638 | 4/1993 | Redmond, Jr. | 401/35 X |
| 5,534,671 | 7/1996 | Gierut et al. . | |
| 5,541,375 | 7/1996 | Dam et al. . | |
| 5,564,850 | 10/1996 | Nagaoka | 401/37 |
| 5,576,502 | 11/1996 | Fukushima et al. . | |
| 5,633,471 | 5/1997 | Fukushima . | |
| 5,635,682 | 6/1997 | Cherdak et al. . | |
| 5,707,307 | 1/1998 | Robben et al. | 401/31 X |

FOREIGN PATENT DOCUMENTS

| | | | |
|---|---|---|---|
| 359276 | 9/1920 | Germany | 401/32 |
| 655804 | 8/1951 | United Kingdom | 401/32 |

Primary Examiner—Henry J. Recla
Assistant Examiner—Kathleen J. Prunner
Attorney, Agent, or Firm—Barlow, Josephs & Holmes, Ltd.

[57] ABSTRACT

A stylus tip for inputting information into electronic devices is provided on the writing end of a writing implement so that the operator can quickly and easily switch between writing with an ink tip cartridge to input information with the stylus tip without significant manipulation of the pen. More specifically, the writing implement comprises an elongated body portion including a first end, a second end and an outer surface constructed and arranged to be gripped by a user. Located within an interior chamber of the body portion is a retractable ink cartridge actuated by a conventional push button/spring biased actuator. The stylus tip is preferably integrally formed with the outer surface of the first end of the body portion extending forwardly from the first end of the body portion such that the stylus tip is presented for use when the body portion is gripped by a user in a normal writing grip. The ink cartridge is normally moveable between a first, retracted position wherein the writing tip of the ink cartridge is disposed within the interior chamber of the body portion and the stylus tip is exposed for use, and a second, extended position wherein the writing tip extends outwardly from the interior chamber beyond the first end of the body portion for engagement with a conventional paper writing media.

14 Claims, 5 Drawing Sheets

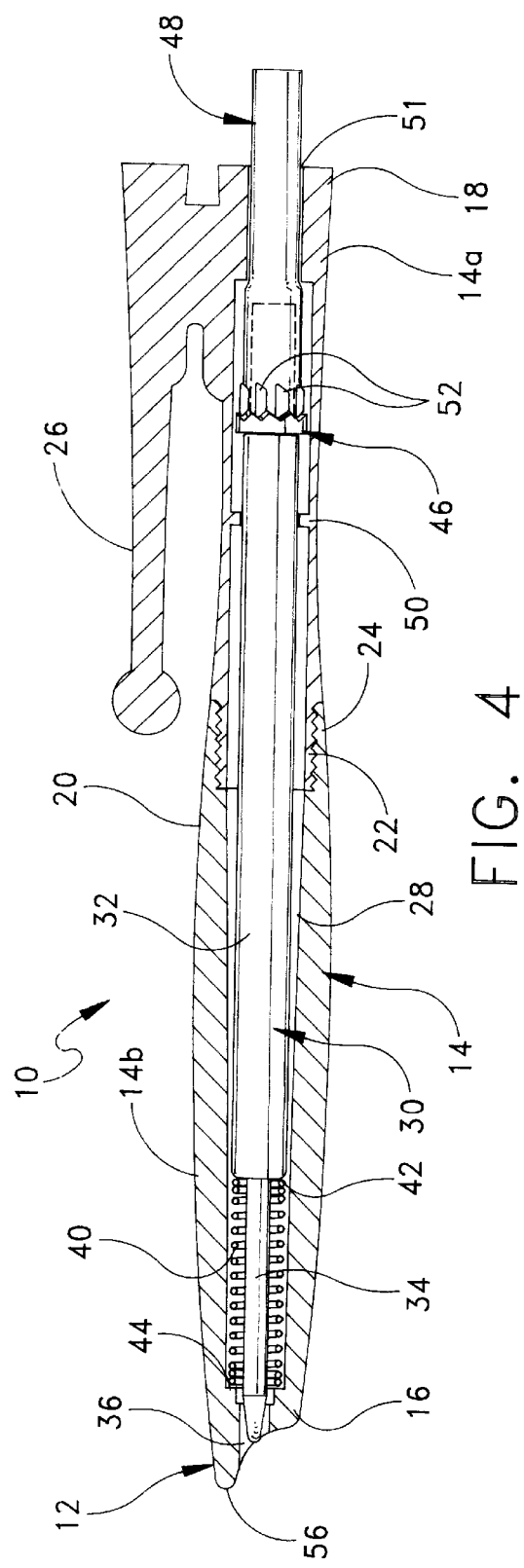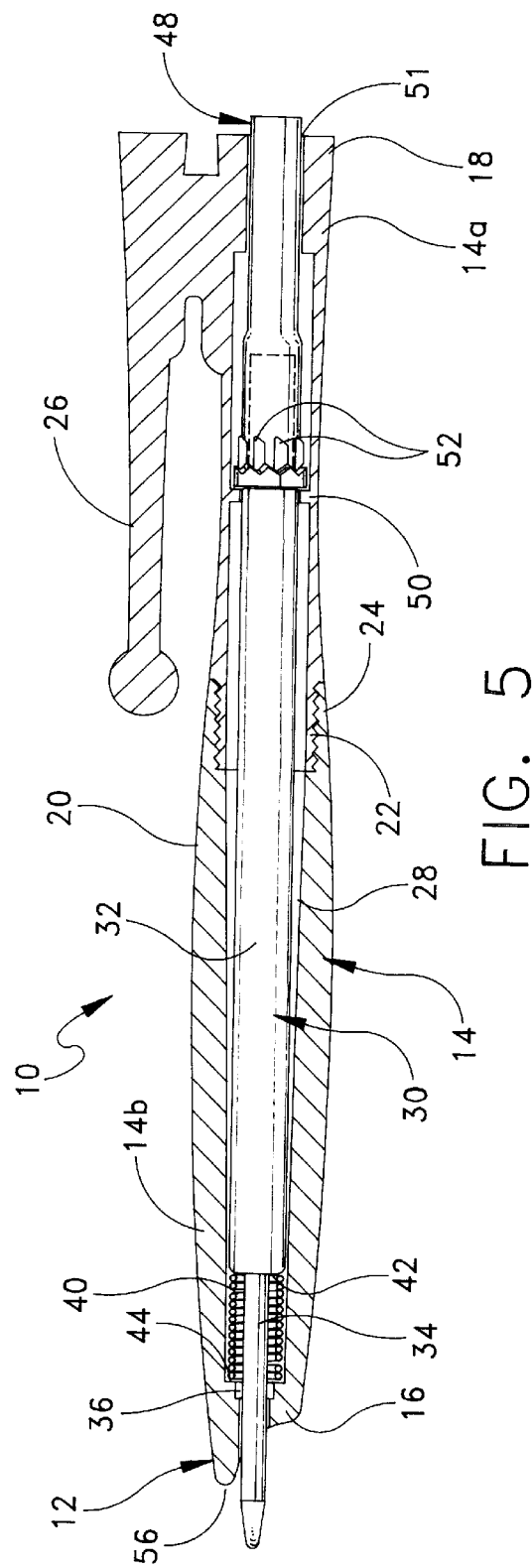

WRITING IMPLEMENT INCLUDING AN INPUT STYLUS

This application is related to co-pending U.S. patent application Ser. No. 29/087,768, now U.S. Pat. No. D 402,690, which is co-owned with the present application.

BACKGROUND AND SUMMARY OF THE INVENTION

1) Technical Field

The present application relates to a combination input stylus for inputting information into an electronic input device and writing implement for writing on conventional paper media.

2) Background of Related Art

An input stylus is a device that allows a user to input data through an input surface, such as a input pad or liquid crystal display (LCD) screen, into a computer. For example, one common use for electronic input devices is the electronic capture of signatures utilized by many delivery services, and retail outlets for credit card authorization. The signing party utilizes a plastic tip input stylus to sign their name on an input pad. The signatures are electronically kept on file for later use. An input stylus is also now utilized with many electronic organizers, such as the PalmIII™ Personal Organizer (PalmIII is a trademark of 3COM, Inc.) to input information into an LCD input pad. Typically, an input stylus, or pen, includes a body portion adapted to be gripped by a user, and a small diameter plastic tip (usually about 1/32 of an inch) for contacting the screen or pad in order to accurately input information. An input stylus generally does not include ink or other writing media. Therefore, when switching from an electronic input device to conventional writing, a user must generally change from the input stylus to a conventional pen containing ink or the like. In order to simplify switching between an input stylus and a conventional pen, devices which combine both functions have been proposed.

U.S. Pat. No. 5,564,850 to Nagaoka discloses a combined input stylus and ink pen in a single unit wherein the stylus is located at one end of the implement and the ink writing tip is located at the opposing end thereof. The Nagaoka pen also includes a single cap which is utilized to cover either the tip of the stylus or the ink pen tip. Since the stylus tip is positioned at one end of the Nagaoka device and the ink pen tip is positioned at an opposite end of the pen, the Nagaoka design requires the user to flip the pen over and back again in order to switch between the stylus and ink pen tips. In addition, the user must remove the cap and switch it from the ink end to the stylus end, and vice versa, each time the user switches from stylus to ink in order to expose the tip being utilized and so as to not misplace the cap. This type of pen can, therefore, be inconvenient to use and can also become damaged if the cap is lost.

U.S. Pat. No. D 390,872 discloses an ornamental design for a two-ended pen which is similar to the Nagaoka pen in that it includes a plastic stylus tip and ink pen tip positioned at opposite ends of the pen and includes a single cap.

While these two existing design are effective for their intended use, there is nevertheless a perceived consumer desire for a combined instrument for inputting information into an input device and for writing on conventional paper media which is also easy to use, convenient and inexpensive.

SUMMARY

In accordance with the present invention, a stylus tip for inputting information into electronic devices is provided directly on the writing end of a writing implement so that the operator can quickly and easily switch between writing with an ink tip cartridge to input information with the stylus tip, and vice versa, without significant manipulation of the pen. More specifically, the writing implement comprises an elongated body portion including a first end, a second end and an outer surface constructed and arranged to be gripped by a user. Located within an interior chamber of the body portion is a retractable ink cartridge preferably actuated by a conventional push button/spring biased actuator. It is to be understood throughout this specification that the writing implement could also comprise a retractable pencil, or other writing implement and that the retraction apparatus could also comprise a twist-type retraction, or other known retraction apparatus. The necessary functionality being that a writing tip is retractable and extendable from the first end, i.e. the writing end, of the implement. In accordance with the preferred embodiment, the stylus tip is preferably integrally formed with the outer surface of the first end of the body portion, extending forwardly from the first end of the body portion, such that the stylus tip is presented for use at the writing end of the pen when the body portion is gripped by a user in a normal writing grip.

In use, the ink cartridge is moveable between a first, retracted position wherein the writing tip of the ink cartridge is disposed within the interior chamber of the body portion and the stylus tip is available for use, and a second, extended position wherein the writing tip, i.e. ink tip, extends outwardly from the interior chamber beyond the first end of the body portion for engagement with a conventional paper writing media. The key concept for the device is that the user can switch between entering information with the stylus tip to writing on paper simply by clicking the actuator button on the end of the pen to extend the ink tip, and vice versa. In a twist actuator model, the operator would simply rotate the upper and lower portions of the barrel to extend or retract the writing tip. It is believed that the present invention provides a significant advantage over the prior art by providing the stylus tip at the writing end of the pen rather than at an opposing end because there is less manipulation of the pen with a retraction mechanism rather than with a removable cap model as shown in the prior art.

In a second embodiment, the stylus tip is integrally formed into a removable tip for mounting on a conventional pen. The removable stylus tip is preferably provided as an accessory item for mounting on pens having a removable writing tip. The stylus portion extends forwardly from the body beyond the writing end of the pen so as to be available for use when the writing tip is retracted inside the pen body.

In a third embodiment, the stylus tip is provided with a tubular spring channel body which is releasably received onto the barrel of the writing end of any conventional retractable pen. The stylus portion extends forwardly from the body beyond the writing end of the pen so as to be available for use when the writing tip is retracted inside the pen body.

Accordingly, among the objects of the present invention are: the provision of a writing implement which can readily be used as both an input pen for inputting information into an input device, and a writing implement for writing on conventional media; the provision of a writing implement having a stylus tip disposed on an outer surface of the body portion adjacent the writing end of the implement whereby both the writing tip and stylus tips are disposed at the same end of the implement; the provision of such a writing implement including a retractable writing tip wherein stylus tip is available for use when the writing tip is retracted, and the writing tip is available for use when the writing tip is extended; and the provision of a stylus tip accessory for a writing implement which is removably mounted on the body of a conventional writing implement adjacent the writing tip.

Other objects, features and advantages of the invention shall become apparent as the description thereof proceeds when considered in connection with the accompanying illustrative drawings.

DESCRIPTION OF THE DRAWINGS:

In the drawings which illustrate the best mode presently contemplated for carrying out the present invention:

FIG. 4 is a cross-section view thereof taken along line 4—4 of FIG. 3 showing the pen barrel in the retracted position;

FIG. 5 is another cross-sectional view thereof with the pen barrel in the extended position;

DESCRIPTION OF THE PREFERRED EMBODIMENT

Figure 1:
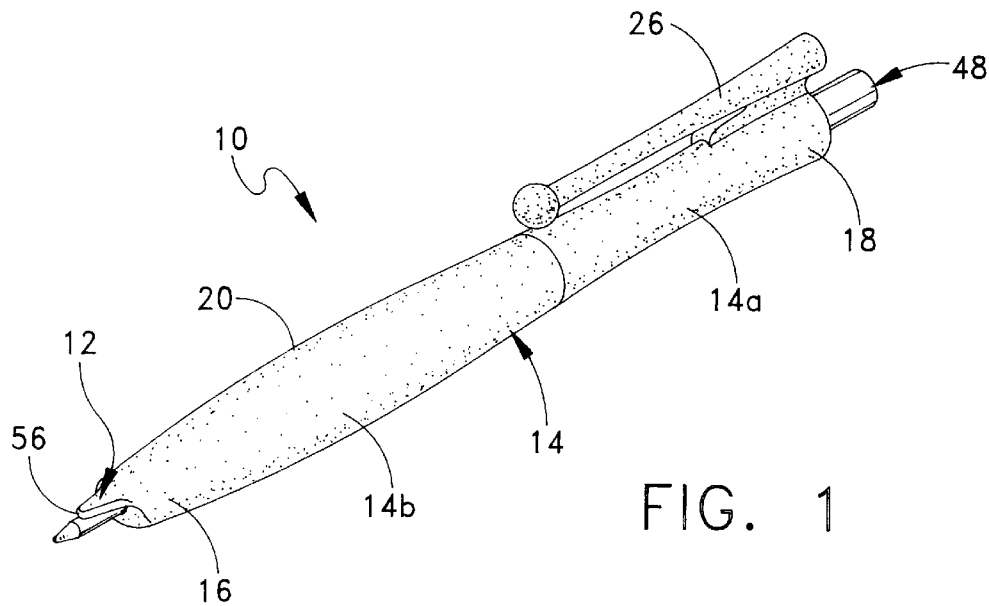
FIG. 1 is a perspective view of the writing instrument of the present invention.
Figure 2:
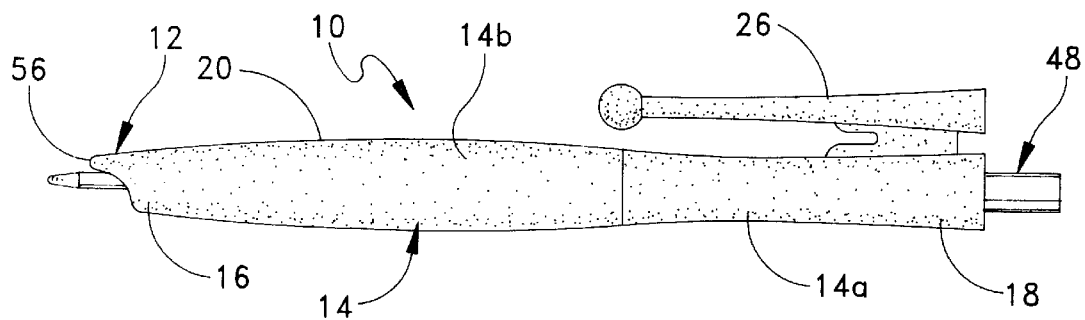
FIG. 2 is a side view thereof.
Figure 3:
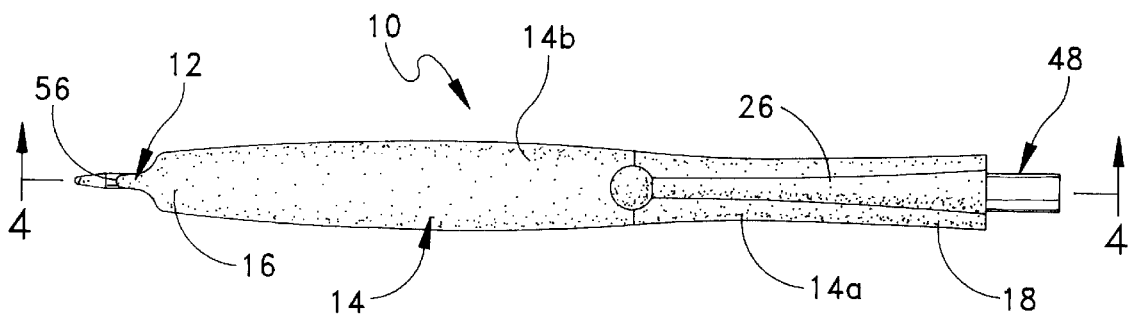
FIG. 3 is a top view thereof.

Referring now to the drawings, the writing implement of the instant invention is illustrated and generally indicated at 10 in FIGS. 1–5. As will hereinafter be more fully described, a stylus tip, generally indicated at 12, for inputting information into electronic devices, is incorporated directly into the writing end of the writing implement 10 so that the operator can quickly and easily switch between writing with a conventional, such as an ink tip cartridge, to input information with the stylus tip, and vice versa, without significant manipulation of the pen.

The writing implement 10 comprises an elongated body portion generally indicated at 14 having a first, writing end 16, a second end 18, and an outer surface 20 which is constructed and arranged to be gripped by a user. The body portion 14 is preferably fashioned from a suitable plastic or metallic material and is more preferably fashioned in a two-part construction with upper and lower barrel portions indicated 14a and 14b respectively. The barrel portions 14a and 14b are preferably engaged in interfitting relation by means of threaded engagement surfaces 22, 24 respectively, on mating ends thereof. The upper barrel portion 14a includes a clip 26 for removably securing the pen in a pocket, etc.

The upper and lower barrel portions 14a and 14b cooperate to define an interior chamber 28. Located within the interior chamber 28 is a conventional writing implement, such as an ink cartridge, generally indicated at 30. It is to be understood throughout this specification that the writing implement 30 could also comprise a retractable pencil, or other writing implements, such as markers, felt tip pens, etc, and that the term writing implement is intended to broadly define all variations of writing implements, including, but not limited to, those as described herein. The ink cartridge 30 includes a body portion 32 which resides within the interior chamber 28, and a smaller diameter writing tip 34 which is slidably movable between retracted and extended positions (FIGS. 4 and 5) through a longitudinal opening 36 in the writing end 16 of the body portion 14.

Figure 4A:
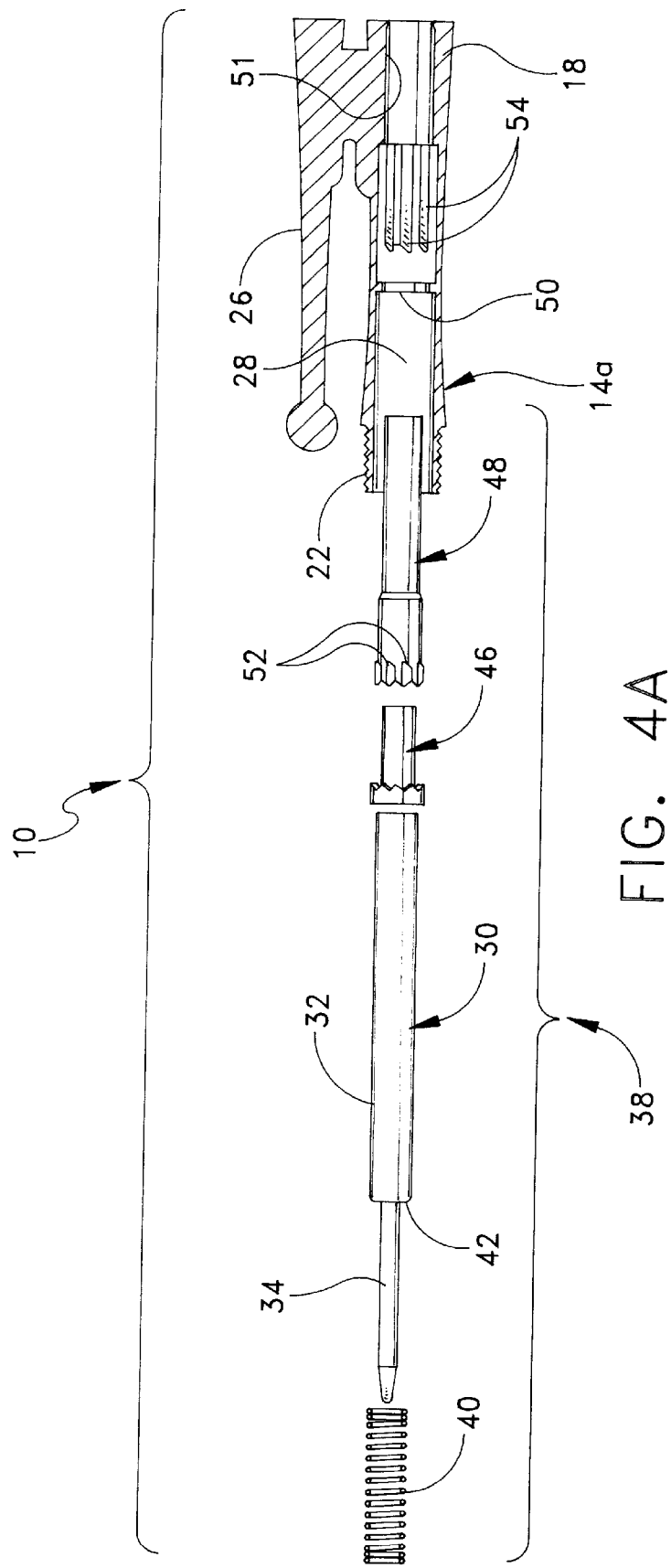
FIG. 4A is an exploded perspective view of the interior components of the pen.

The ink cartridge 30 is preferably actuated by a conventional push button/spring biased actuator assembly generally indicated at 38 (FIG. 4A). The assembly 38 includes a coil spring 40 captured between a shoulder 42 on the ink cartridge 30 and a shoulder 44 formed on interior chamber wall of the lower barrel portion 14b. The spring 40 normally biases the ink cartridge 30 to the retracted position within the pen (FIG. 4). The actuator assembly 38 further includes a ratchet 46 and actuator button 48 which engage the upper end of the body portion 32 of the ink cartridge 30 (See FIG. 4A). The ratchet 46 and push button 48 are slidably disposed within the interior chamber 28 in the upper barrel portion 14a. As is conventional in the pen art, the ratchet 46 and push button 48 are retained within the upper barrel portion 14a by an interference shoulder 50 wherein the upper portion of the push button 48 extends upwardly and outwardly through a longitudinal opening 51 in the upper end of the barrel portion 14a. The ratchet 46 and push button 48 operate in a conventional manner for extension and retraction of the ink cartridge 30, and in this regard, the push button 48 is provided with circumferentially spaced ridges 52 which interengage with channels 54 formed on the interior chamber wall 28 in the upper barrel portion 14a (See FIG. 4A). Both the channels 54 and ridges 52 include complementary cam surfaces and ledges (not specifically designated) which cause the push button 48 to be able to rotate and lock in upper and lower positions within the upper barrel portion (See FIGS. 4 and 5). In use, pushing the actuator button 48 inwardly extends and locks the writing tip 34 of the ink cartridge 30 in the extended portion (FIG. 5), while pushing the button 48 a second time will release the button 48 and allow the spring 40 to retract the ink cartridge 30 back into the body portion 14 (FIG. 4). The above description is intended to be a brief summary of retracting pen operation since the specific operation of push button retraction assemblies is believed to be well known in the art. It is to be understood that the necessary functionality of the device is that a writing tip 34 is retractable and extendable from the first end, i.e. the writing end, of the implement, and therefore that the retraction apparatus could alternately comprise a twist-type retraction, or other known retraction apparatus.

In accordance with the preferred embodiment of the invention, the stylus tip 12 is preferably integrally formed with the outer surface 20 of the first end 16 of the body portion 14, extending forwardly from the first end of the body portion, such that the stylus tip 12 is presented for use at the writing end of the pen when the body portion is gripped by a user in a normal writing grip. The stylus tip 12 tapers gradually inwardly to form a rounded engagement portion 56 which is intended to engage an electronic input surface. The engagement portion 56 preferably has a spherical surface with a diameter of approximately $\frac{1}{32}$ of an inch. The tip 12 is also circumferentially located on the body portion 14 to be generally in the same plane as the clip 26. In this manner, when the pen 10 is held in a normal writing grip, i.e. with the clip 26 facing upwardly, the stylus tip 12 is presented in a convenient manner for writing on an electronic input surface.

In use, the ink cartridge 30 is moveable between a first, retracted position (FIG. 4) wherein the writing tip 34 of the ink cartridge 30 is disposed within the interior chamber 28 of the body portion 14 and the stylus tip 12 is available for use, and a second, extended position wherein the writing tip 34, i.e. ink tip, extends outwardly from the interior chamber 28 beyond the first end 16 of the body portion 14 for engagement with a conventional paper writing media. The key concept for the device 10 is that the user can easily switch between entering information with the stylus tip 12 to writing on paper media simply by clicking the actuator button 48 on the end of the pen to extend the ink tip, and vice versa. In a twist actuator model, the operator would simply rotate the upper and lower portions of the barrel 14a, 14b to extend or retract the writing tip. It is believed that the present invention provides a significant advantage over the prior art by providing the stylus tip 12 at the writing end 16 of the pen 10 rather than at an opposing end because there is less manipulation of the pen with a retraction mechanism rather than with a removable cap model as shown in the prior art.

Figure 6:
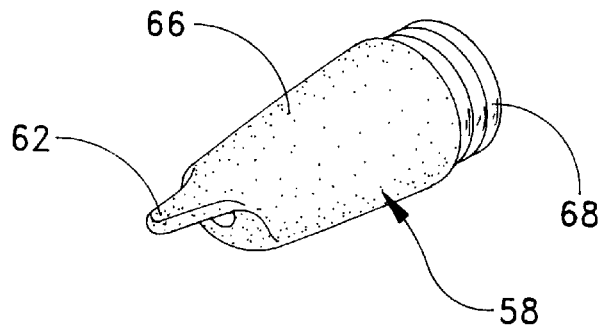
FIG. 6 is a perspective view of an alternate embodiment of the stylus tip.
Figure 7:
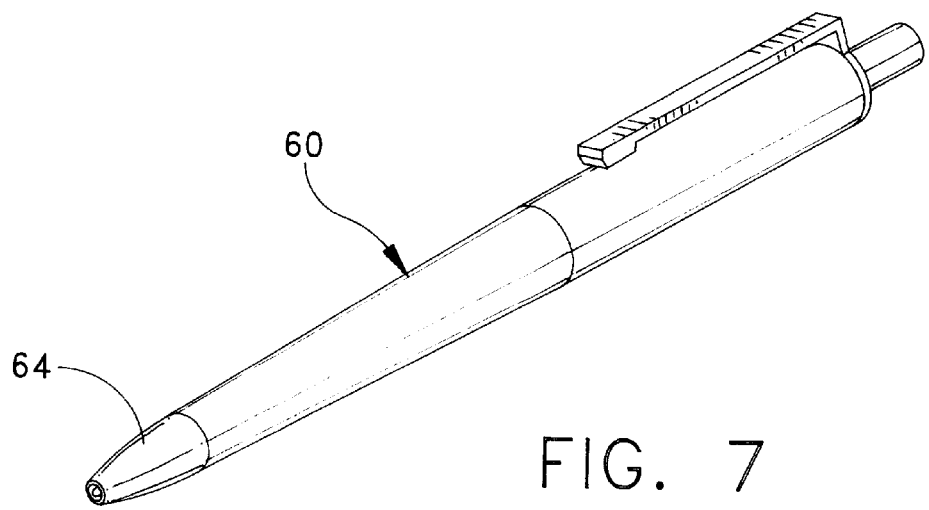
FIG. 7 is a perspective view of the tip in association with a conventional pen barrel.
Figure 8:
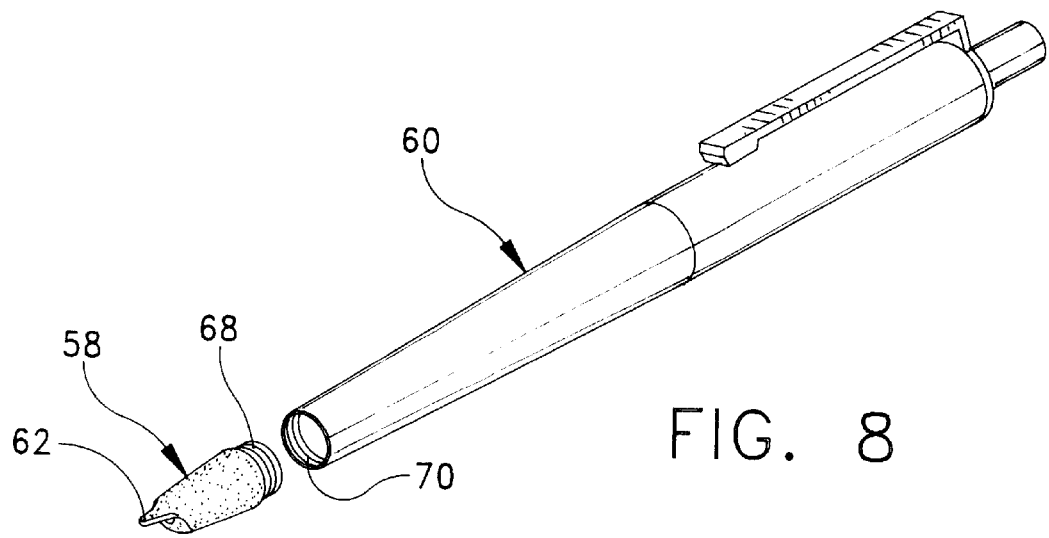
FIG. 8 is another perspective view thereof with the stylus tip mounted on the pen barrel.

Referring now to FIGS. 6–8, a second embodiment of the invention is illustrated and generally indicated at 58. The second embodiment 58 comprises a removable stylus tip for mounting on a conventional pen 60 wherein the removable tip 58 includes the integrally formed stylus tip 62. The removable stylus tip 58 is preferably provided as an accessory item for mounting on conventional pens 60 having a conventional removable writing tip 64. The stylus tip 58 comprises a body portion 66 having the stylus portion 62 integrally extending forwardly from the body portion 66. The rear end of the body portion 66 preferably includes a threaded shoulder 68 for threaded mounting into a threaded opening 70 (FIG. 8) in the aforementioned pens. In use, the conventional writing tip 64 of the pen would be removed (FIG. 7), and the stylus tip 58 installed so that the stylus tip 58 is available for use when the writing tip is retracted inside the pen body (FIG. 8). The pen would 60 then be functional in the same manner as described hereinabove.

Figure 9:
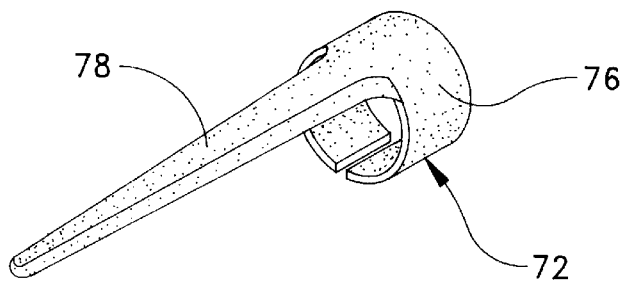
FIG. 9 is a perspective view of a third embodiment of the stylus tip.
Figure 10:
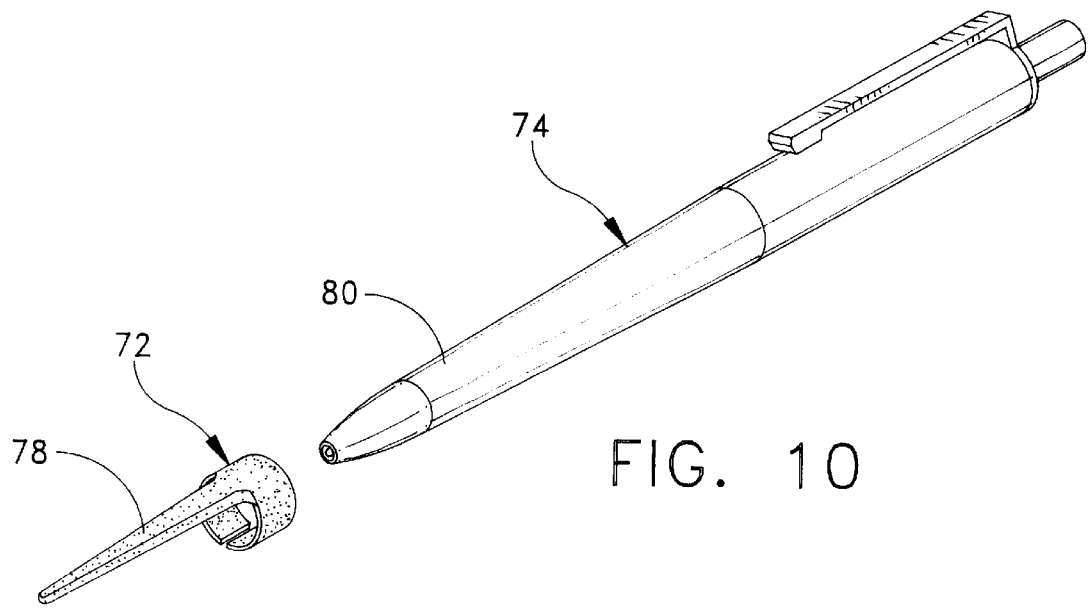
FIG. 10 is a perspective view of the stylus tip in association with a conventional pen.
Figure 11:
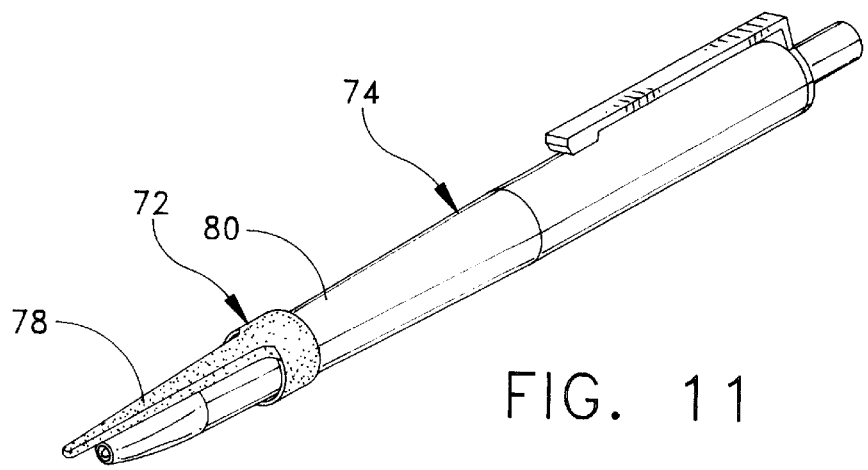
FIG. 11 is another perspective view thereof with the stylus tip mounted on the pen barrel.

Referring now to FIGS. 9–11, a third embodiment of the invention is illustrated and generally indicated at 72. The third embodiment comprises a removable stylus tip 72 for mounting on a conventional pen 74 and is preferably provided as an accessory item for mounting on conventional pens. The stylus tip 72 comprises a tubular spring channel body portion 76 having the stylus tip portion 78 integrally extending forwardly from the body portion 76. The tubular spring channel body 76 is releasably received onto the barrel 80 of the writing end of any conventional retractable pen 74. In use, the stylus tip 72 is installed around the barrel 80 of the pen 74 in a longitudinal position that allows the stylus tip portion 78 to be available for use when the writing tip is retracted inside the pen body. The pen 74 would then be functional in the same manner as described hereinabove.

It can therefore be seen that the present invention provides a unique and effective writing implement which can readily be used as both an input pen for inputting information into an electronic input device, and a writing implement for writing on conventional media. By providing a stylus tip at the writing end of the pen, the instant invention significantly reduces hand manipulation of the pen during use. Furthermore, since the pen mechanism is relatively simple in construction, the pen can be manufactured and sold at a price level which is similar to existing pens. Accordingly, the instant invention adds significant additional functionality to an existing product without significantly increasing the price thereof. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A writing implement comprising:

an elongated body portion defining an interior chamber and including a first end having a bore therethrough, a second end and an outer surface constructed and arranged to be gripped by a user;

a non-hollow, non-retractable stylus tip for inputting information into electronic devices, said stylus tip extending from the outer surface of said elongated body portion adjacent said first end thereof;

a writing tip at least partially disposed within said interior chamber and moveable through said bore between a first, retracted position wherein said writing tip is disposed within said interior chamber between the first and second ends of said body portion, and a second, extended position wherein said writing tip extends from said interior chamber beyond the first end of said body portion and said styles tip for engaging a writing media, said stylus tip having an interior surface coextensive with the interior surface of said bore; and actuator apparatus for selectively moving the writing tip between the retracted position and the extended position.

2. The writing implement of claim 1, wherein said stylus tip and said body portion are formed as a unitary member.

3. The writing implement of claim 2, wherein said stylus tip includes a rounded engagement portion for engagement with an input device.

4. The writing implement of claim 2 wherein said actuator apparatus includes a push button actuator slidably mounted within the second end of the body portion.

5. The writing implement of claim 1, wherein said stylus tip includes a rounded engagement portion for engagement with an input device.

6. The writing implement of claim 5, wherein said writing tip comprises an ink cartridge, said actuator apparatus comprising a spring captured between said ink cartridge and said interior chamber, and further comprising a push button actuator slidably mounted at the second end of the body portion.

7. The writing implement of claim 1 wherein said actuator apparatus includes a push button actuator slidably mounted within the second end of the body portion.

8. The writing implement of claim 1 wherein said writing tip comprises an ink cartridge, said actuator apparatus comprising a spring captured between said ink cartridge and said interior chamber, and further comprising a push button actuator slidably mounted at the second end of the body portion.

9. A writing implement comprising:

an elongated body portion defining an interior chamber and including a first end having a bore therethrough, a second end and an outer surface constructed and arranged to be gripped by a user, said body portion including an integrally formed non-hollow, non-retractable stylus tip for inputting information into electronic devices, said stylus tip extending outwardly from the first end of said elongated body portion such that the stylus tip is presented for use when the body portion is gripped by a user in a normal writing grip;

a writing tip at least partially disposed within said interior chamber and moveable through said bore between a first, retracted position wherein said writing tip is disposed within said interior chamber between the first and second ends of said body portion, and a second, extended position wherein said writing tip extends from said interior chamber beyond the first end of said body portion and said stylus tip for engaging a writing media, said stylus tip having an interior surface coextensive with the interior surface of said bore; and actuator apparatus selectively moving the writing tip between the retracted position and the extended position.

10. The writing implement of claim 9 wherein said stylus tip includes a rounded engagement portion for engaging an input device.

11. The writing implement of claim 10 wherein said actuator apparatus includes a push button actuator slidably mounted within the second end of the body portion.

12. The writing implement of claim 10 wherein said writing tip comprises an ink cartridge disposed within said interior chamber, said actuator apparatus comprising a spring captured between said ink cartridge and said interior chamber, and further comprising a push button slidably mounted at the second end of the body portion.

13. The writing implement of claim 9 wherein said actuator apparatus includes a push button actuator slidably mounted within the second end of the body portion.

14. The writing implement of claim 9 wherein said writing tip comprises an ink cartridge disposed withing said interior chamber, said actuator apparatus comprising a spring captured between said ink cartridge and said interior chamber, and further comprising a push button slidably mounted at the second end of the body portion.

* * * * *